Patented May 4, 1948

2,440,988

UNITED STATES PATENT OFFICE 2,440,988

DICYANODIAMIDE CONDENSATION PRODUCTS AND A PROCESS FOR MAKING SAME

Jules Treboux, Riehen, near Basel, and Ricardo Bellvilà, Basel, Switzerland, assignors to J. R. Geigy, A. G., Basel, Switzerland, a Swiss firm No Drawing. Application March 9, 1945, Serial No. 581,960. In Switzerland March 14, 1944

4 Claims. (Cl. 260—69)

It is known to obtain products capable of improving the fastness properties in the moist state of direct dyeings, by condensing dicyanodiamide with formaldehyde. However, the condensation products thus obtained have the disadvantage that, in the liquid state, they are very sticky, while, in the solid form, they tend to agglomerate in view of their hygroscopicity, so that their use is rendered very difficult. Besides they are unstable to sulfate-ions, as they produce precipitations with sulfate-ions.

We have now found that, by an after-condensation of the said dicyanodiamide-formaldehyde-condensation products with ammonium salts of mineral acids and by a further condensation with formaldehyde, non-hygroscopic products of high efficacy and of stability to sulfate-ions are obtained.

When, instead of the dicyanodiamide-formaldehyde-condensation product, dicyanodiamide alone is interacted with ammonium salts and subsequently condensed with formaldehyde, hygroscopic products are also obtained which are precipitated by the presence of sulfate-ions.

The invention is now illustrated, but not limited by the following example, the parts being by weight unless otherwise stated.

Example 84 parts of dicyanodiamide and 100 parts of 30% formaldehyde are boiled under reflux for 15 minutes, treated with 54 parts of ammonium chloride, further boiled for 4 hours and finally further condensed for 4 hours at 80° C. with 200–300 parts of 30% formaldehyde. After concentration by evaporation there will be obtained a bright, water-soluble resin which is not hygroscopic. 0.3 g. of this product per liter of the after-treating-bath make direct-colored cellulosic fibres fast to water and improve distinctly the washing-fastness properties of such fibres.

The proportion of the quantities of products used in this example may be varied. Thus, for instance the quantity of the formaldehyde used for the first condensation step can be increased to the 1½-fold or also higher. If instead of ammonium chloride, another inorganic ammonium salt, such as ammonium sulfate or ammonium phosphate is used, products of similar properties will be obtained.

What we claim is:

1. A process for the manufacture of a dicyanodiamide condensation product comprising boiling in aqueous medium a condensation product from one mole of dicyanodiamide and at least one mole and at most 1.5 moles of formaldehyde with a molar portion of an ammonium salt of a strong mineral acid, and then condensing the so-obtained product with at least 2 moles and at most 3 moles of formaldehyde while heating.

2. A process for the manufacture of a dicyanodiamide condensation product comprising boiling in aqueous medium a condensation product from one mole of dicyanodiamide and at least one mole and at most 1.5 moles of formaldehyde with a molar portion of ammonium chloride, and then condensing the so-obtained product with at least 2 moles and at most 3 moles of formaldehyde while heating.

3. A process for the manufacture of a dicyanodiamide condensation product comprising boiling in aqueous medium a condensation product from one mole of dicyanodiamide and at least 1 mole and at most 1.5 moles of formaldehyde with a molar portion of ammonium sulfate, and then condensing the so-obtained product with at least 2 moles and at most 3 moles of formaldehyde while heating.

4. A process for the manufacture of a dicyanodiamide condensation product comprising boiling in aqueous medium a condensation product from one mole of dicyanodiamide and at least one mole and at most 1.5 moles of formaldehyde with a molar portion of ammonium phosphate, and then condensing the so-obtained product with at least 2 moles and at most 3 moles of formaldehyde while heating.

JULES TREBOUX.
RICARDO BELLVILÀ.

REFERENCES CITED

The following references are of record in the file of this patent:

UNITED STATES PATENTS

| Number | Name | Date |
|---|---|---|
| 2,214,067 | Petersen | Sept. 10, 1940 |
| 2,405,863 | Treboux | Aug. 13, 1946 |